US011396635B2

United States Patent
Galvin et al.

(10) Patent No.: US 11,396,635 B2
(45) Date of Patent: Jul. 26, 2022

(54) METHOD AND APPARATUS FOR AGGLOMERATING HYDROPHOBIC PARTICLES

(71) Applicant: The University of Newcastle, Callaghan (AU)

(72) Inventors: Kevin Patrick Galvin, Callaghan (AU); Kim van Netten, Callaghan (AU)

(73) Assignee: THE UNIVERSITY OF NEWCASTLE, Callaghan (AU)

( * ) Notice: Subject to any disclaimer, the term of this patent is extended or adjusted under 35 U.S.C. 154(b) by 300 days.

(21) Appl. No.: 15/576,390

(22) PCT Filed: May 23, 2016

(86) PCT No.: PCT/AU2016/050395
§ 371 (c)(1),
(2) Date: Nov. 22, 2017

(87) PCT Pub. No.: WO2016/187658
PCT Pub. Date: Dec. 1, 2016

(65) Prior Publication Data
US 2018/0155650 A1    Jun. 7, 2018

(30) Foreign Application Priority Data

May 22, 2015   (AU) ................................ 2015901887
Oct. 8, 2015    (AU) ................................ 2015904102

(51) Int. Cl.
*C10L 5/04*         (2006.01)
*C10L 5/10*         (2006.01)
(Continued)

(52) U.S. Cl.
CPC .  *C10L 5/04* (2013.01); *B01J 2/10* (2013.01); *C10L 5/10* (2013.01); *C10L 5/105* (2013.01);
(Continued)

(58) Field of Classification Search
CPC .. C10L 5/04; C10L 2250/084; C10L 2290/54; C10L 5/363; C10L 5/105;
(Continued)

(56) References Cited

U.S. PATENT DOCUMENTS 3,856,668 A * 12/1974 Shubert .................. B01D 12/00
                                                              210/633
4,169,714 A    10/1979 Calvert
(Continued)

FOREIGN PATENT DOCUMENTS

AU         2010100971 A4    10/2010
CN         102834181 A      12/2012
(Continued)

OTHER PUBLICATIONS

K. van Netten, "Avoiding Waste: A Case Study on Fast Agglomeration of Fine Coal using a Novel and Economic Binder", Centre for Advanced Particle Processing and Transport, Newcastle Institute for Energy and Resources, University of Newcastle, NSW 2308, Australia.
(Continued)

*Primary Examiner* — Ellen M McAvoy
*Assistant Examiner* — Ming Cheung Po
(74) *Attorney, Agent, or Firm* — Cantor Colburn LLP

(57) ABSTRACT

The present invention provides a method and apparatus for agglomerating hydrophobic particles from a feed slurry. The method comprises adding a binder to a feed stream and conveying the feed stream and binder to an agglomerating device. The binder comprises 50% or more by volume of a non-hydrophobic substance. A high shear is applied to the feed stream and the binder in the agglomerating device to cause the hydrophobic particles to collide and bind to the binder, thereby agglomerating the hydrophobic particles. The agglomerated hydrophobic particles and the binder are
(Continued)

removed from the feed stream. A method and apparatus for dewatering an agglomerated product is also provided, the agglomerated product comprising agglomerated hydrophobic particles held together by a binder comprising 50% or more by volume of a non-hydrophobic substance.

30 Claims, 9 Drawing Sheets

(51) Int. Cl.
B01J 2/10 (2006.01)
C10L 5/36 (2006.01)

(52) U.S. Cl.
CPC ......... *C10L 5/363* (2013.01); *C10L 2250/084* (2013.01); *C10L 2290/24* (2013.01); *C10L 2290/30* (2013.01); *C10L 2290/54* (2013.01)

(58) Field of Classification Search
CPC .... C10L 5/10; C10L 2290/24; C10L 2290/30; C10L 2290/50; B01J 2/10
See application file for complete search history.

(56) References Cited

U.S. PATENT DOCUMENTS

| | | | | |
|---|---|---|---|---|
| 4,302,211 A | * | 11/1981 | Verschuur | B03B 9/005 |
| | | | | 44/593 |
| 4,436,618 A | * | 3/1984 | Rigby | B01D 12/00 |
| | | | | 210/729 |
| 9,789,492 B2 | * | 10/2017 | Yoon | B03B 1/04 |
| 2014/0360094 A1 | * | 12/2014 | Galvin | C10L 5/22 |
| | | | | 44/551 |

FOREIGN PATENT DOCUMENTS

| | | | |
|---|---|---|---|
| CN | 104302745 B | 3/2017 | |
| GB | 2168907 A | * 7/1986 | ............ B01D 69/00 |
| WO | 02092205 A1 | 11/2002 | |
| WO | 2011094680 A2 | 8/2011 | |
| WO | 2013110142 A1 | 8/2013 | |

OTHER PUBLICATIONS

K. van Netten, "Enhanced Recovery of Fine Coal Particles using a Modified Oil Agglomeration Process", Australasian Particle Technology Society (APTS), Student Conference, Sep. 27-29, 2013.
K. van Netten, "Preparation of Coal Agglomerates Using a Water-in-Oil Emulsion", School of Engineering, The University of Newcastle, Callaghan, NSW 2308, Australia, p. 332-226.
Kim van Netten, "A kinetic study of a modified fine coal agglomeration process", Procedia Engineering 102 ( 2015 ) 508-516.
Kim van Netten, "Fine Particle Beneficiation through Selective Agglomeration with an Emulsion Binder", 2014 American Chemical Society, Ind. Eng. Chem. Res. 2014, 53, 15747-15754.
International Preliminary Report on Patentability for corresponding application PCT/AU2016/050395 filed May 23, 2016; dated Jun. 7, 2017.
International Search Report for corresponding application PCT/AU2016/050395 filed May 23, 2016; dated Aug. 29, 2016.
Chinese Office Action for corresponding application 201680041724.8; dated Nov. 19, 2019.

* cited by examiner

METHOD AND APPARATUS FOR AGGLOMERATING HYDROPHOBIC PARTICLES

FIELD OF THE INVENTION

The present invention relates to a method and apparatus for agglomerating hydrophobic particles using a binder and has been devised particularly though not solely for beneficiating and dewatering coal fines in tailings using a binder in the form of a concentrated water in oil emulsion.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Selective agglomeration of fine coal particles, using a binder liquid such as oil, is a powerful process for selectively growing particles of ultrafine coal (less than 0.5 millimetres in diameter) into small balls up to several millimetres in diameter, leaving behind ultrafine particles of clay and mineral matter. In this application, the hydrophobic oil wets the hydrophobic coal particles selectively, causing the fine coal and oil to adhere and evolve into fine coal agglomerates. The hydrophilic gangue fails to adhere, and hence remains as a dispersed suspension of particles. The fine coal agglomerates are then separated over a screen, with the agglomerates remaining on the screen and the fine suspension of gangue slurry passing through the screen. The agglomerates are strong enough to withstand the washing of the slimes through the screen, allowing for a clean coal product of modest moisture to be produced. This beneficiation technology was shown to be effective on fine coal tailings, but was abandoned as non-economical due the amount of oil required, whose cost was prohibitive.

There has been previously described a more economic approach to achieving selective agglomeration of fine coal particles, utilising a concentrated water in oil emulsion instead of pure oil as a binder. This water in oil emulsion has a very high viscosity due to the tight packing of the water drops within the oil phase, with perhaps 90% of the material consisting of dispersed water drops. Stability is achieved through the action of an emulsifier that is soluble in the oil phase. This novel binder appears to be almost as effective as pure oil, for the same volume, but is mostly water. The use of this emulsion has demonstrated a 10-fold reduction in the required oil for the same yield of fine coal.

It has been shown that a simple, but intense, mixing vessel should be sufficient for achieving the agglomeration of hydrophobic particles. However, a disadvantage of a mixing vessel is that it cannot deliver the same level of efficiency as a plug flow arrangement due to the variable residence time distribution and variable levels of mixing intensity throughout its volume. Hence, a plug flow arrangement may be preferred where the smallest possible system is required. Implementing a mixing vessel with a plug flow arrangement poses its own challenges in delivering the right mixing conditions, including mechanical agitation. Moreover, there are significant scale-up issues, and moving components, such as an agitator, increasing complexity and cost in implementation.

It is an object of the present invention to overcome or ameliorate at least one of the disadvantages of the prior art, or to provide a useful alternative. It is an object of at least one embodiment of the invention to provide a method and apparatus for agglomerating hydrophobic particles that offers very small residence times, involves no moving parts, and can be scaled-up. It is also an object of at least one embodiment of the invention to permit some in situ classification process within the agglomerating apparatus itself ahead of a dewatering screen so that non-agglomerated particles larger than the aperture of the dewatering screen are rejected, and hence do not flow onto the dewatering screen with the agglomerated hydrophobic particles.

SUMMARY OF THE INVENTION

According to a first aspect the present invention provides a method for agglomerating hydrophobic particles from a feed slurry, comprising:

adding a binder emulsion to a feed stream comprising said feed slurry, said binder comprising 50% or more by volume of a non-hydrophobic substance contained within a hydrophobic binder;

conveying said feed stream and said binder emulsion to an agglomerating device;

applying a high shear to said feed stream and said binder emulsion in said agglomerating device to cause said hydrophobic particles to collide and bind to said binder emulsion, thereby agglomerating said hydrophobic particles; and removing said agglomerated hydrophobic particles and said binder emulsion from said feed stream.

Preferably, the method comprises dividing said binder emulsion into individual binder emulsion portions. The dividing step preferably comprises applying a hydrodynamic force to said binder emulsion.

Preferably, said dividing step comprises extruding said binder emulsion directly into said feed stream, thereby forming said binder emulsion portions. More preferably, said dividing step comprises extruding said binder emulsion into said feed stream at multiple locations.

Alternatively, said dividing step preferably comprises stirring said binder emulsion in a solution to suspend said binder emulsion portions in said solution. Preferably, said suspended binder emulsion portions are pumped into said feed stream. In one embodiment, said binder emulsion is stirred in water to form a slurry comprising said binder emulsion portions.

Preferably, said adding step comprises adding said binder emulsion to a first region of said feed stream that has a lower pressure than a second region of said feed stream. More preferably, said feed stream conduit comprises a feed pump and said first region is located before said feed pump and said second region is located after said feed pump.

Preferably, said shear applying step comprises producing a pressure drop within said agglomerating device. This pressure drop is preferably caused by high internal shear stresses that develop within the feed stream and binder emulsion.

Preferably, the method further comprises retaining said feed stream and said binder emulsion in said agglomerating device for less than 10 seconds. More preferably, said feed stream and said binder emulsion is retained in said agglomerating device for less than 5 seconds. It is further preferred that said feed stream and said binder emulsion is retained in said agglomerating device for less than 3 seconds. In one embodiment, said feed stream and said binder emulsion is retained in said agglomerating device for less than 1 second.

In other embodiments, said feed stream and said binder emulsion is retained in said agglomerating device for less than 0.75 seconds. In other embodiments, said feed stream and said binder emulsion is retained in said agglomerating device for approximately 0.6 seconds. In further embodiments, said feed stream and said binder emulsion is retained in said agglomerating device for approximately 0.2 seconds.

Preferably, said shear applying step comprises forcing said feed stream and said binder emulsion through a reduced flow area. More preferably, said reduced flow area comprises an opening having a smaller diameter than a diameter of a passage in said agglomerating device.

Preferably, said shear applying step comprises changing a flow direction of said feed stream and said binder emulsion.

Preferably, the method further comprises permitting in situ rotational flow of the agglomerated hydrophobic particles and non-agglomerated particles in said agglomerating device to promote segregation of agglomerated and non-agglomerated particles. In some embodiments, said segregated non-agglomerated particles comprise coarser-sized non-agglomerated hydrophobic particles.

Preferably, the method comprises removing said agglomerated hydrophobic particles and finer non-agglomerated particles separately from said segregated coarser non-agglomerated particles.

Preferably, said agglomerating device comprises a separation chamber and said shear applying step comprises inducing a high shear rotational flow within said separation chamber. More preferably, said high shear rotation flow causes said segregation of non-agglomerated particles.

Preferably, said feed stream and said binder emulsion enter tangentially into said separation chamber, relative to a cross-section of said separation chamber.

Preferably, said agglomerating device comprises a passage and an opening having a smaller diameter than the diameter of said passage, and said shear applying step comprises forcing said feed stream and said binder emulsion through said opening to cause a pressure drop in the flow of said feed stream and said binder emulsion. In some embodiments, said agglomerating device comprises a flow restricting device that creates said opening. In other embodiments, a portion of said passage tapers toward said opening to form a venturi-type tube. In further embodiments, said opening is formed by an orifice plate mounted in said passage.

Preferably, the method further comprises initially dewatering said agglomerated hydrophobic particles. More preferably, said initial dewatering step comprises discharging said agglomerated hydrophobic particles onto a dewatering screen.

It is further preferred that the method comprises subsequently dewatering said agglomerated hydrophobic particles to remove said non-hydrophobic substance from said binder emulsion. More preferably, said subsequent dewatering step comprises applying shear to collapse said binder emulsion, releasing said non-hydrophobic substance from said binder emulsion. In some embodiments, said subsequent dewatering step comprises applying centrifugal force. In these embodiments, this would involve passing said agglomerated hydrophobic particles through a centrifuge. In other embodiments, said subsequent dewatering step comprises applying pressure. In these embodiments, this would involve producing a pressure drop to apply shear to said agglomerated hydrophobic particles.

In a further embodiment, said subsequent dewatering step further comprises forcing said agglomerated hydrophobic particles through a reduced flow area to apply shear to said agglomerated hydrophobic particles. More preferably, said subsequent dewatering step further comprises passing said agglomerated hydrophobic particles through a shearing device comprising a passage and an opening having a smaller diameter than the diameter of said passage to form said reduced flow area, and forcing said agglomerated hydrophobic particles through said opening. In some embodiments, said opening is formed by an orifice plate mounted in said passage.

Alternatively, said subsequent dewatering step comprises passing said agglomerated hydrophobic particles through a filter.

Preferably, said subsequent dewatering step is repeated one or more times. In some embodiments, said subsequent dewatering step further comprises passing said agglomerated hydrophobic particles through a centrifuge after applying shear to said agglomerated hydrophobic particles. In other embodiments, said subsequent dewatering step further comprises passing said agglomerated hydrophobic particles through a filter after applying shear to said agglomerated hydrophobic particles.

Preferably, said subsequent dewatering step further comprises applying shear to said agglomerated hydrophobic particles for less than 30 seconds, more preferably less than 15 seconds, even more preferably less than 5 seconds and most preferably less than 1 second.

Preferably, said binder emulsion comprises a concentrated water in oil emulsion.

It is preferred that the binder emulsion comprises 60% or more by volume of the non-hydrophobic substance. More preferably, the binder emulsion comprises 75% or more by volume of the non-hydrophobic substance. It is further preferred that the binder emulsion comprises 80% or more by volume of the non-hydrophobic substance. It is also preferred that the binder emulsion comprises 90% or more by volume of the non-hydrophobic substance.

Preferably, said hydrophobic particles have a diameter of up to 2 mm. More preferably, said hydrophobic particles have a diameter of up to 500 µm (0.5 mm). In some embodiments, said hydrophobic particles have a diameter of up to 400 µm (0.4 mm). In other embodiments, said hydrophobic particles have a diameter of up to 300 µm (0.3 mm) In further embodiments, said hydrophobic particles have a diameter of up to 200 µm (0.2 mm). In yet another embodiment, said hydrophobic particles have a diameter of up to 45 µm (0.045 mm).

Preferably, said feed stream comprises the underflow from a classifying device, said underflow comprising hydrophobic particles up to 2 mm in diameter. More preferably, said classifying device comprises a classifying screen. Even more preferably, the feed stream comprises a cyclone overflow stream with hydrophobic particles much finer than 2 mm.

Preferably, said feed is the dilute underflow stream from a flotation process. More preferably, said flotation process is a reverse flotation process.

A second aspect of the present invention provides an apparatus for agglomerating hydrophobic particles from a feed slurry, comprising:

a feed stream conduit fluidly connected to an agglomerating device for conveying said feed slurry to said agglomerating device; and a binder conduit fluidly connected to said feed stream conduit for adding a binder emulsion to said feed slurry, said binder emulsion comprising 50% or more by volume of a non-hydrophobic substance contained within a hydrophobic binder;

wherein a high shear is induced within said agglomerating device to cause said hydrophobic particles to collide and bind to said binder emulsion, thereby agglomerating said hydrophobic particles; and wherein said agglomerated hydrophobic particles and said binder emulsion are removed after passing through said agglomerating device.

Preferably, the apparatus comprises a dividing device for separating said binder emulsion into individual binder emulsion portions. It is preferred that said dividing device applies a hydrodynamic force to said binder emulsion. More preferably, said dividing device comprises an extruder for extruding said binder emulsion into said feed stream conduit. In one embodiment, there is a plurality of extruders arranged along said feed stream conduit to extrude said binder emulsion into said feed stream at multiple locations.

Alternatively, said dividing device comprises a mixing device for stirring said binder emulsion in a solution to form suspended binder emulsion portions in said solution. Preferably, said mixing device comprises a mixing vessel having a mechanical agitator. More preferably, said mixing device is connected to a pump to pump said binder emulsion portions into said feed stream conduit.

Preferably, said binder conduit fluidly connects said dividing device to said feed stream conduit.

Preferably, said binder conduit is fluidly connected to said feed stream conduit to add said binder emulsion in a first region of said feed stream that has a lower pressure than a second region of said feed stream. More preferably, said feed stream conduit comprises a feed pump and said binder conduit is fluidly connected to said feed stream conduit upstream of said feed pump.

Preferably, said agglomerating device comprises a reduced flow area through which said feed stream and said binder emulsion flow, in order to apply said high shear.

Preferably, said agglomerating device changes a flow direction of said feed stream and said binder emulsion to apply said high shear.

Preferably, said agglomerating device internally produces a pressure drop to apply said high shear.

Preferably, said agglomerating device comprises a separation chamber comprising an inlet, wherein a high shear rotational flow is induced within said separation chamber. More preferably, said agglomerating device comprises an outlet to remove said agglomerated hydrophobic particles from said separation chamber. In one embodiment, said rotational flow causes segregation of the said agglomerated hydrophobic particles and non-agglomerated particles. In some embodiments, said separation chamber comprises a hydrocyclone. It is contemplated that a separation chamber is preferably used where non-agglomerated particles are larger than the aperture size of a downstream dewatering screen. Preferably, said separation chamber has a conical end. More preferably said conical end comprises a discharge outlet for removing coarser-sized non-agglomerated particles, Preferably, said separation chamber outlet is positioned near the top of said separation chamber. In other embodiments, said separation chamber outlet is positioned along a central axis of said separation chamber.

Preferably, said agglomerating device comprises a passage, an opening and a flow restricting device for restricting the flow of said feed stream and said binder emulsion, said flow restricting device and said opening cooperate to induce a pressure drop in said flow, thereby causing said colliding and binding of said hydrophobic particles to said binder emulsion. More preferably, said flow restricting device comprises a valve.

Preferably, said agglomerating device comprises a passage and an opening having a smaller diameter than the diameter of said passage, and said agglomerating device forces a flow of said feed stream and said binder emulsion through said opening to induce a pressure drop in said flow, thereby causing said colliding and binding of said hydrophobic particles to said binder emulsion. In one embodiment, said opening is formed in an orifice plate mounted in said passage. In another embodiment, said opening is formed by a partially closed valve. In other embodiments, a portion of said passage tapers towards said opening to form a venturi-type passage.

A third aspect of the present invention provides a system for agglomerating hydrophobic particles from a feed slurry, comprising the apparatus of the second aspect and a shearing device for applying shear to said agglomerated hydrophobic particles.

Preferably, said shearing device comprises a reduced flow area through which said agglomerated hydrophobic particles flow, in order to apply said shear. More preferably, said shearing device comprises a passage and an opening having a smaller diameter than the diameter of said passage to form said reduced flow area. In one embodiment, said opening is formed in an orifice plate mounted in said passage. In another embodiment, said shearing device comprises a valve and said opening is formed by partially closing said valve. In other embodiments, a portion of said passage tapers towards said opening to form a venturi-type passage.

Preferably, said shearing device changes a flow direction of said agglomerated hydrophobic particles to apply said shear.

Preferably, said shearing device comprises a centrifuge or a filter.

According to a fourth aspect the present invention provides a method for dewatering an agglomerated product, said agglomerated product comprising agglomerated hydrophobic particles held together by a binder emulsion comprising 50% or more by volume of a non-hydrophobic substance contained within a hydrophobic binder, the method comprising:

applying a shearing force to said agglomerated product to collapse said binder emulsion, releasing said non-hydrophobic substance from said binder emulsion; and separating said non-hydrophobic substance from said agglomerated hydrophobic particles.

Preferably, said method comprises applying pressure or centrifugal force to collapse said binder emulsion, releasing said non-hydrophobic substance from said binder emulsion. More preferably, said method comprises producing a pressure drop to apply shear to said agglomerated product. In some embodiments, said method comprises passing said agglomerated product through a centrifuge. In other embodiments, said method comprises passing said agglomerated product through a filter.

Preferably, said method comprises forcing said agglomerated product through a reduced flow area to apply shear to said agglomerated hydrophobic particles. More preferably, said method further comprises passing said agglomerated product through a shearing device comprising a passage and an opening having a smaller diameter than the diameter of said passage to form said reduced flow area, and forcing said agglomerated product through said opening. In some embodiments, said opening is formed by an orifice plate mounted in said passage.

Preferably, said application of said shear to said agglomerated product is repeated one or more times.

Preferably, said method further comprises applying shear to said agglomerated product for less than 30 seconds, more preferably less than 15 seconds, even more preferably less than 5 seconds and most preferably less than 1 second.

A fifth aspect of the present invention provides an apparatus for dewatering an agglomerated product, said agglomerated product comprising agglomerated hydrophobic particles held together by a binder emulsion comprising 50% or more by volume of a non-hydrophobic substance contained within a hydrophobic binder, said apparatus comprising:

a conduit fluidly connected to a shearing device for conveying said agglomerated product to said shearing device;

wherein said shearing device applies a shearing force to said agglomerated product to collapse said binder emulsion, releasing said non-hydrophobic substance from said binder emulsion; and at least one outlet for separating non-hydrophobic substance from said agglomerated hydrophobic particles.

Preferably, said shearing device comprises a reduced flow area through which said agglomerated product flows, in order to apply said shear. More preferably, said shearing device comprises a passage and an opening having a smaller diameter than the diameter of said passage to form said reduced flow area. In one embodiment, said opening is formed in an orifice plate mounted in said passage. In another embodiment, said shearing device comprises a valve and said opening is formed by partially closing said valve. In other embodiments, a portion of said passage tapers towards said opening to form a venturi-type passage.

Preferably, said shearing device changes a flow direction of said agglomerated product to apply said shear.

Preferably, said shearing device comprises a centrifuge or a filter.

Preferably, said at least one outlet comprises an outlet for removing said non-hydrophobic substance from said apparatus.

Preferably, said at least one outlet comprises an outlet for removing said agglomerated hydrophobic particles from said apparatus.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

The present invention will now be described with reference to the following examples which should be considered in all respects as illustrative and non-restrictive. One particular application of the invention is selective agglomeration of fine coal particles using a binder emulsion comprising 50% or more by volume of a non-hydrophobic substance, such as water. It is further preferred that the binder emulsion comprises 60% or more by volume of the non-hydrophobic substance, more preferably comprises 75% or more by volume of the non-hydrophobic substance, even more preferably comprises 80% or more by volume of the non-hydrophobic substance and further preferably comprises 90% or more by volume of the non-hydrophobic substance. The binder emulsion is also most preferably a water in oil emulsion. Aside from the beneficial characteristics of very high viscosity, stability, equivalent effectiveness to more costly oil on a per volume basis and 10-fold reduction in the required oil for the same yield of fine coal, it has been discovered that the agglomeration residence time is substantially reduced when the water in oil emulsion binder is used, to as little as 3 seconds in a mixing vessel and to typically less than 1 second in the agglomerating device implemented as part of the present invention.

Figure 1:
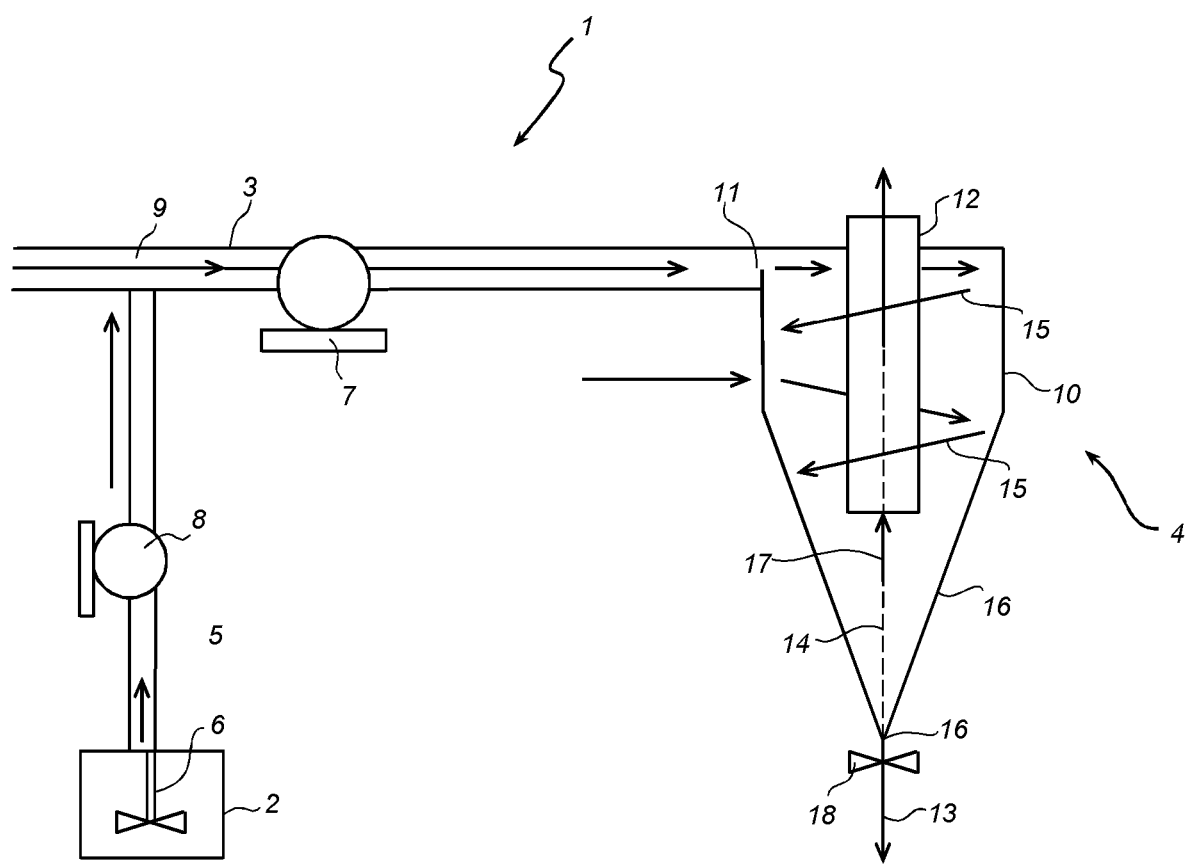
FIG. 1 is a schematic drawing illustrating an apparatus according to one embodiment of the invention.

Referring to FIG. 1, a preferred embodiment of the invention is illustrated. The apparatus 1 comprises a dividing device 2, a feed stream conduit 3 fluidly connected to an agglomerating device 4 and a binder conduit 5 fluidly connecting the dividing device 2 to the feed stream conduit 3. The dividing device 2 in this embodiment is a mixing vessel that disperses the binder in a solution using a mechanical agitator 6. However, in other embodiments, the binder is added to the feed stream conduit 3 without being divided.

The binder is thus divided by a simple hydrodynamic break up process, the objective being to produce distinct macroscopic portions of the binder, as opposed to seeking maximum dispersion, as is required in conventional oil agglomeration. It should be noted that conventional oil agglomeration requires the precursor wetting of the hydrophobic particles by the oil, whereas in the embodiments of the invention the macroscopic or discrete portions of the binder, which are highly viscous, remain largely intact, acting as a sink for the collection of the fine hydrophobic particles.

Both the feed stream conduit 3 and the binder conduit 5 take the form of pipes in this embodiment. Also, the feed stream conduit 3 and the binder conduit 5 have respectively associated pumps 7, 8 to assist in conveying the feed slurry and binder. It will be appreciated that the feed pumps 7, 8 may be omitted in other embodiments. The feed slurry is typically formed from oil drops, bubbles, solid particles or semi-solid particles or semi-liquid particles.

In this embodiment, the binder is preferably the concentrated water in oil emulsion above, although other binders may be used in the invention. These alternative binders may include a foam-like medium, other inexpensive media as a replacement of the water in the water in oil emulsion binder and a binder where the outer surface of the binder drops are covered in surfactant instead of oil, thus presenting a hydrophobic surface.

The mixing vessel 2 breaks up the concentrated water in oil emulsion via the agitator 6 into discrete or individual portions, which are then conveyed by the binder pipe 5 and pump 8 to the feed stream 9 comprising a feed slurry comprising hydrophobic particles, such as fine coal particles. The binder portions are preferably added to the feed slurry prior to the feed pump 7, though the binder portions could be added after the feed pump 7 if the binder portions are delivered at sufficient pressure. Relatively little mixing between the binder portions and feed slurry occurs within this flowing feed stream, at least initially.

The feed slurry and binder portions are then conveyed into the agglomerating device 4, which in this embodiment comprises a separation chamber 10 having a tangential inlet 11, an outlet pipe 12 and a discharge outlet 13. The agglomerating device 4 embodies both a constriction via the inlet 11 and outlet 12, and a significant directional change due to the separation chamber walls redirecting the flow of the incoming feed slurry and binder, producing a significant shear field and system pressure drop. This shearing action alone produces the agglomeration of the hydrophobic particles via the binder portions.

The separation chamber 10 is located in situ and acts in a similar manner to a hydrocyclone so that the incoming feed slurry and binder portions flow rotationally and in a spiral about a central axis 14 of the chamber 10, as shown by arrows 15. Thus, the tangential inlet 11 sends the entering feed slurry and binder portions into a state of rotation around an inner annulus, segregating the non-agglomerated particles, with the coarser-sized non-agglomerated particles being forced outwards to the conical wall, and downwards to a conical or apex end 16 discharge.

In the embodiment, the conical or apex end 16 is open, permitting the coarser-sized non-agglomerated particles to be rejected. The remaining flow moves radially inwards, leaving the chamber 10 via the outlet pipe 12, reporting as an overflow. The rapid kinetics in the apparatus 1 results in a fully agglomerated product that reports to the overflow.

The agglomerated product (i.e. the agglomerated hydrophobic particles) is relatively low in density compared to the hydrophilic or gangue particles, or even the water, and so it tends to rise upwards in the separation chamber 10. Thus, the agglomerated hydrophobic particles naturally report to the system overflow. Invariably, satisfactory performance can thus be achieved by using a hydrocyclone-type device.

In other embodiments, the inlet 11 need not be a tangential inlet. Likewise, the chamber outlet need not take the form of an outlet pipe 12, nor need be centrally located as shown in FIG. 1.

In some embodiments, especially where there are not any non-agglomerated particles larger than the aperture of a downstream dewatering screen, the apex end 16 of the separation chamber 10 can be closed. Moreover, in this instance there is no need for a separation chamber, meaning that a simpler configuration for the agglomerating device can be used and further embodiments of these simpler configurations are described in more detail below.

It will be appreciated that where a density based separation is used, the agglomerated hydrophobic particles can be further separated from the dense suspension of fine gangue by opening the discharge outlet 13 via a valve 18 to remove the underflow that contains the gangue. Some adjustment may be required to minimise the possibility of the fine coal agglomerates reporting to the underflow.

After leaving the agglomerating device 4, the overflow stream of fine coal agglomerates can then be dewatered and rinsed on a screen (not shown), resulting in a final clean coal product. The binder, including the non-hydrophobic substance contained within the binder, survives this initial dewatering step, while the non-agglomerated material, typically hydrophilic particles such as gangue, entrained with the process water passes through the screen. In other embodiments, the initial dewatering process can be performed by a chamber downstream, such as an inverted reflux classifier to separate the buoyant agglomerates from the rest of the slurry flow. In this case, the non-agglomerated fine and coarse particles are washed out of the product and hence the initial separation chamber 10 is not required. In other cases, the entire overflow stream might be sent to a large open tank, thickener or a tailings receiving pond, where the clean product is skimmed from the surface. Alternatively, there may simply be a vessel downstream of the overflow to collect the agglomerated hydrophobic particles for subsequent dewatering.

Further dewatering can be applied, as required. Generally, a subsequent dewatering process can be used to remove the non-hydrophobic substance part of the binder from the agglomerated product. The release of the non-hydrophobic substance from the binder involves the action of strong forces, such as pressure driven or centrifugal forces. Hence, the agglomerated product may be passed through a centrifuge or filter. In either case, the centrifuge or filter causes the collapse of the binder, finally releasing the non-hydrophobic substance.

Figure 2:
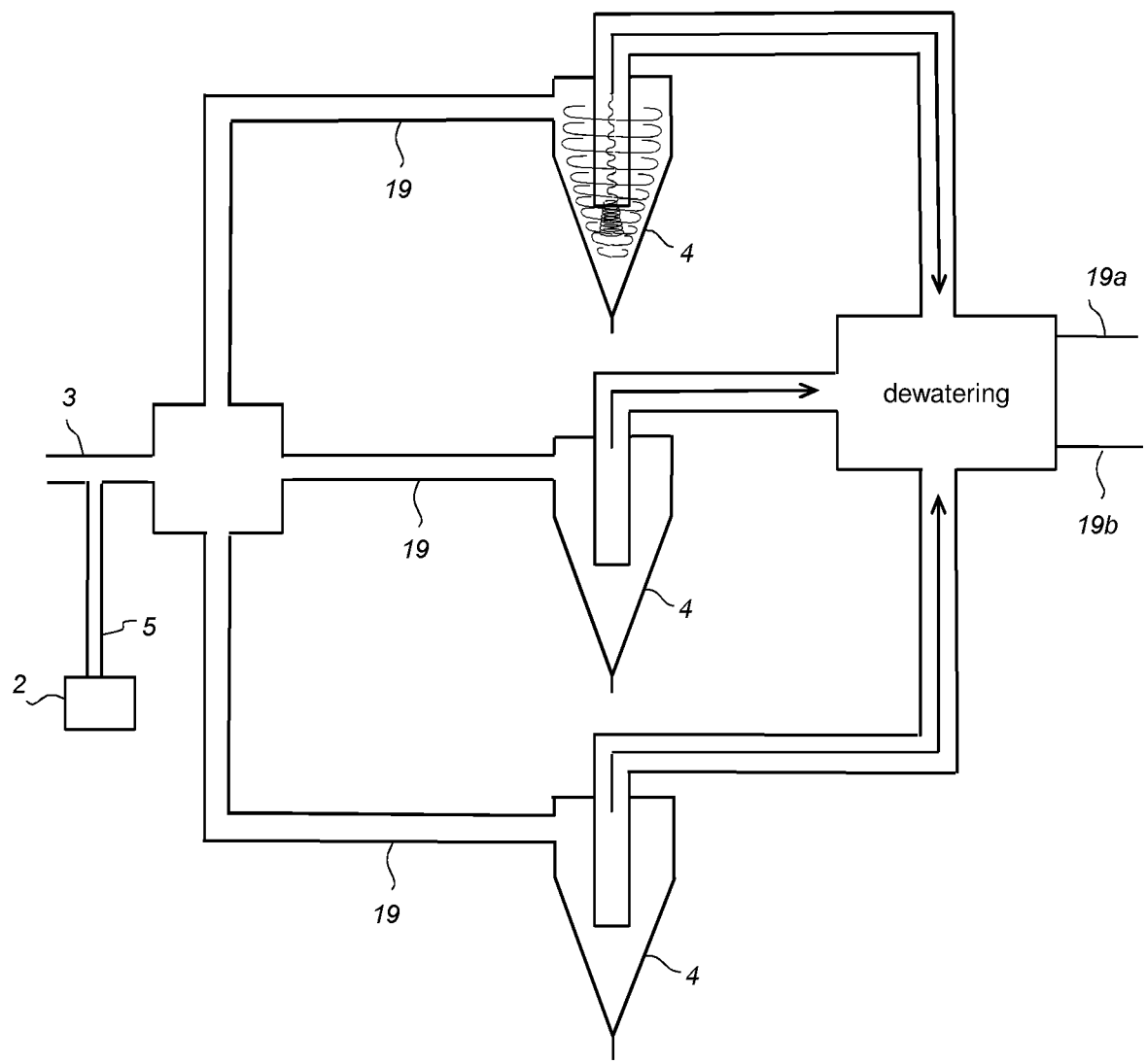
FIG. 2 is a schematic drawing illustrating a system employing the apparatus of FIG. 1.

It has been found that this rotational arrangement of the agglomerating device 4 delivers a residence time of as little as 0.6 s, considerably better than achieved using a mixing tank. When applied to a large coal preparation plant, it is contemplated that a single agglomerating device, less than 1 $m^3$ in volume, would be required to process 2000 $m^3$/h of slurry. However, it is contemplated that a bank of smaller agglomerating devices 4 would be used, connected and operated in parallel off the feed stream conduit 3 via conduits 19, as best shown in FIG. 2. After passing through the dewatering process, the conduit 19a conveys the product stream from the process while the conduit 19b conveys the stream of removed water from the process. This embodiment would be more effective from a scale-up perspective and could involve up to ten in number.

It is believed that the invention could surpass other technologies such as flotation, which by comparison would require 300 s of residence time. Therefore the present invention requires a system volume $\frac{1}{1000}^{th}$ of that presently required. Moreover, the agglomerating device could simultaneously replace the entire fine gravity and fine flotation circuits in a coal preparation plant, together with the associated pumps, and cyclones. If applied to a tailings dump, hydraulic mining could be used to form the feed slurry, while the entire beneficiation could be achieved using a mere orifice plate within the exit pipe, incorporating binder injection.

Figure 3:
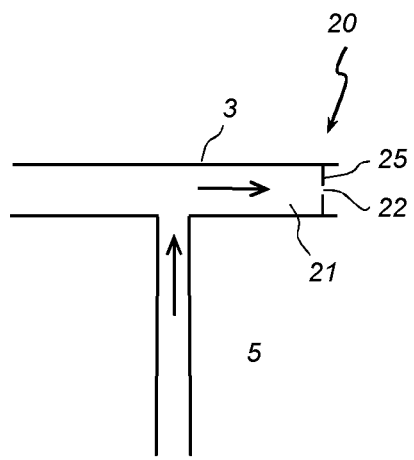
FIG. 3 is a schematic drawing illustrating an exemplary agglomerating device for use in embodiments of the invention.

Referring to FIG. 3, where corresponding features have been given the same reference numerals, an alternative agglomerating device 20 for the apparatus 1 is illustrated. In this embodiment, the arrangement of the dividing device 2, feed stream conduit 3 and binder conduit 5 is the same. However, the agglomerating device 20 is formed as part of the feed stream conduit 3 and has a passage 21 and an opening 22 having a diameter smaller than the diameter of the passage 21. The opening 22 is formed by an orifice plate 25 mounted within the passage 21. The constricted or narrow opening 22 creates significant pressure drop due to the strong flow velocity of the feed slurry and binder portions. This in turn causes the fine coal hydrophobic particles to collide and bind to the binder portions, thus forming agglomerated hydrophobic particles. In this embodiment, the plate 25 is arranged transversely to the longitudinal axis of the passage 21 but this is not required in other embodiments.

Figure 4:
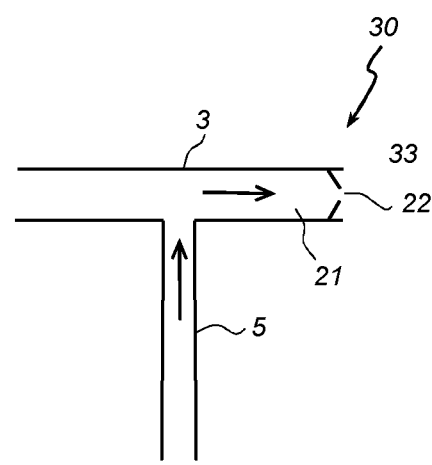
FIG. 4 is a schematic drawing illustrating another exemplary agglomerating device for use in embodiments of the invention.

Referring to FIG. 4, where corresponding features have been given the same reference numerals, another embodiment of an agglomerating device 30 for the apparatus 1 is illustrated. Again, the arrangement of the dividing device 2, feed stream conduit 3 and binder conduit 5 is the same. The difference is the agglomerating device 30 now comprises a portion of the passage 21 in the form of side walls 33 narrowing or tapering to form the opening 22. This arrangement creates a Venturi-type tube that creates the pressure drop that causes the fine coal particles to collide and bind to the binder portions, thus forming agglomerated hydrophobic particles.

Figure 5A:
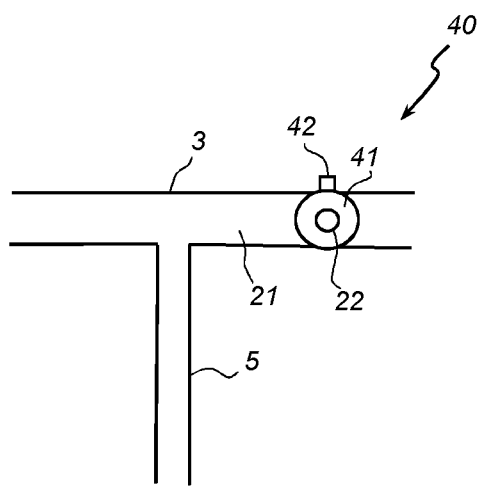
FIGS. 5A and 5B are schematic drawings illustrating a further exemplary agglomerating device for use in embodiments of the invention.
Figure 5B:
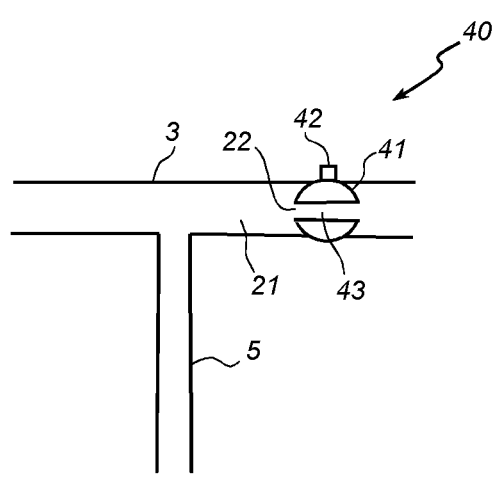

Referring to FIGS. 5A and 5B, where corresponding features have been given the same reference numerals, a further embodiment of an agglomerating device 40 for the apparatus 1 is illustrated. As with the other embodiments, the arrangement of the dividing device 2, feed stream conduit 3 and binder conduit 5 is the same as in FIG. 1. The agglomerating device 40 in this embodiment, however, comprises a ball valve 41 connected to an actuator 42 that is connected to either an actuation shaft (not shown) or handle (not shown). The ball valve 41 comprises an internal bore 42 connecting the openings 22 on either side of the ball valve 41. When in the closed position, as shown in FIG. 5A, the ball valve 41 is rotated by actuator 42 to shut off the openings 22. When in the fully open position, as shown in FIG. 5B, the ball valve 41 is rotated by actuator 42 so that the slurry and binder portions can flow through the openings 22 via internal bore 43. Again, the smaller diameter of the openings 22, and change in the flow direction, relative to the passage, creates the pressure drop that causes the fine coal particles to collide and bind to the binder portions, thus forming agglomerated hydrophobic particles. It will also be appreciated that the ball valve 41 need not be fully open but instead can be partially open and still produce the same effect.

Figure 6:
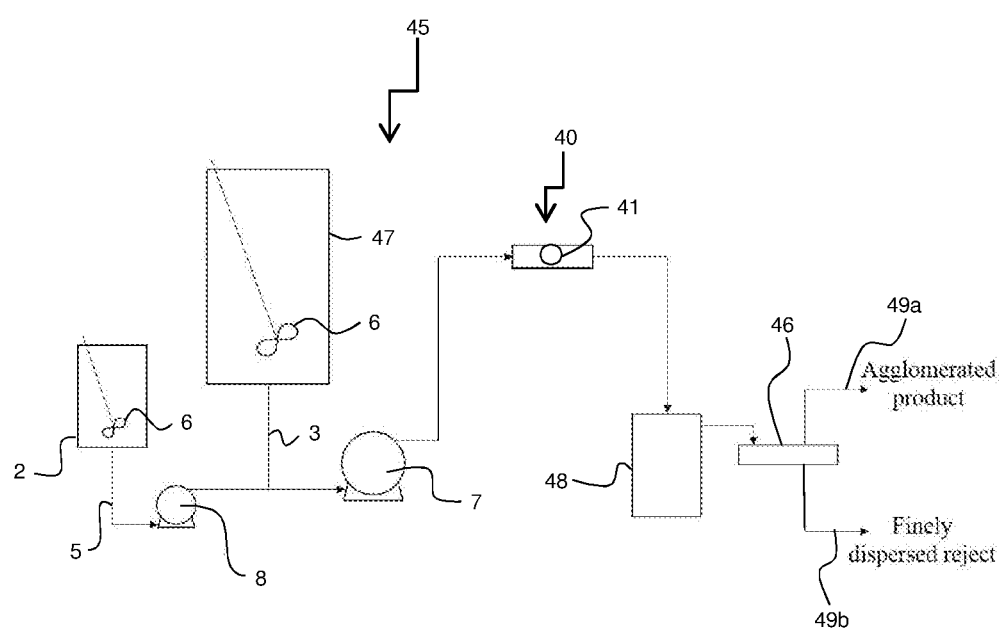
FIG. 6 is a schematic drawing illustrating another system employing the apparatus of FIGS. 5A and 5B.

FIG. 6 illustrates the agglomerating device 40 of FIGS. 5A and 5B integrated into a system 45 having an initial dewatering apparatus in the form of a screen 46, where corresponding features have been given the same reference numerals. The mixing vessel 2 has a mechanical agitator 6 that disperses the binder in a solution. The binder conduit 5 delivers the dispersed binder in solution via a peristaltic pump 8 to the feed stream conduit 3 leading from a feed slurry source in the form of a feed slurry tank 47 with its own mechanical agitator 6. The feed pump 7, being a double diaphragm pump, conveys the feed slurry and binder portions to the agglomerating device 40, where the hydrophobic particles are bound to the binder portions to form agglomerated hydrophobic particles. The agglomerated product is then conveyed to a collection vessel 48, where it is then initially dewatered by passing the agglomerated product over the screen 46. The dewatered agglomerated product 49a can then be subject to further processing, including additional dewatering, while the gangue 49b is removed and either disposed or recycled back into the plant.

In each of the agglomerating devices 20, 30 and 40, the presence of a reduced flow area, in the form of a constriction such as the orifice plate 25, narrowed passage walls 33 or ball valve 41, produces an intense shear field to facilitate agglomeration. Also, a change in the flow direction of the feed slurry and binder portions, such as for example occurs when a fluid passes through a partially closed valve, further forces the feed slurry and binder portions into an intense shear field. It has also been discovered that employing these types of constrictions delivers a residence time as little as 0.2 s, better than the agglomerating device 4 and the conventional mixing tank.

Also, the agglomerating devices 20, 30 and 40 need not be integrated with the feed stream conduit 3, but each comprise a separate pipe defining the passage 21 that is connected to the feed stream conduit 3.

Figure 7:
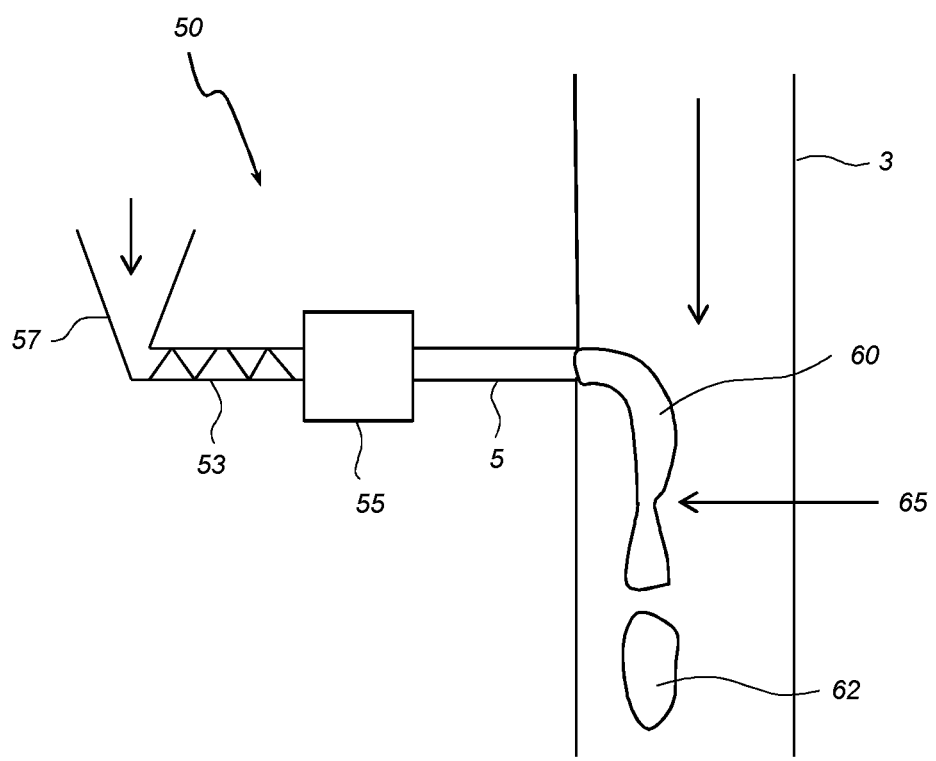
FIG. 7 is a schematic drawing illustrating an extruder used in embodiments of the invention.

It will also be appreciated that other types of dividing devices are used in other embodiments, such as an extruder 50, as best shown in FIG. 7 where corresponding features have been given the same reference numerals. The extruder 50 comprises a screw conveyer 53 and a gear pump 55. The screw conveyer 53 transports a binder (such as the water in oil emulsion) from a hopper 57 to the gear pump 55, which forces the binder under pressure into the feed stream conduit 3 directly. This results in a tubular (toothpaste-like) stream 60 of binder being ejected or formed within the feed stream conduit 3. The binder stream 60 breaks off naturally due to the feed flow through the feed stream conduit 3. In other words, the binder naturally breaks into discrete portions 62 once it exceeds a nominal extruded length due to hydrodynamic stresses, such as shown by arrow 65. It should be further appreciated that in other embodiments (including scaled-up arrangements) multiple extrusion points (via multiplier extruders and/or multiple entry points arranged along the feed stream conduit 3) can be deployed to deliver the binder to the feed stream conduit 3.

Figure 8:
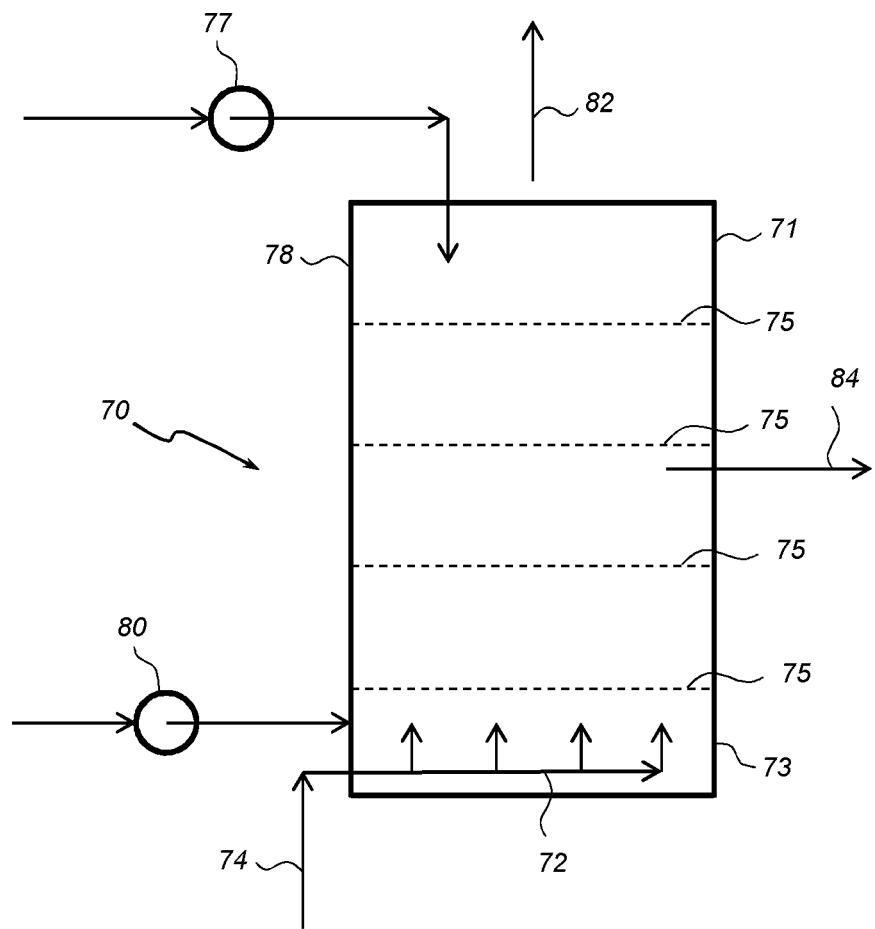
FIG. 8 is a schematic drawing illustrating an apparatus for continuous production of the binder emulsion for use in embodiments of the invention.

In one embodiment, the water in oil emulsion binder is produced on a continuous or steady state basis for delivering to the apparatus 1, as best shown in FIG. 8, where corresponding features have been given the same reference numerals. The production apparatus 70 comprises a vessel 71 having a gas feeder 72 adjacent its bottom 73 for feeding a gas (such as air) from an air inlet 74 and a plurality of mesh plates 75 arranged transversely across the vessel 71 above the gas feeder. A pump 77 continuously delivers oil and the emulsifier to the top 78 of the vessel 71 while another pump 80 continuously delivers an aqueous phase (such as water)

to the bottom 73. The gas from the gas feeder 72, which may be an air distributor, forms bubbles that rises up through the vessel 71, passing through the plates 75 and in the process carries water that is extended in length until it breaks up into smaller droplets. These water droplets tend to settle back down the vessel to the interface between the oil and water where they concentrate. The emulsifier stabilises the droplets, preventing coalescence, and the oil between the droplets drains upwards. As a consequence, a water-in-oil emulsion, having the appearance of foam, is formed. The bubbles exit through the top 78, as shown by arrow 82, since the vessel has an open top. The water in oil emulsion formed in the vessel 71 is then discharged at 84, where it is sent to the dividing device 2, such as the hopper 57 of the extruder 50. The residence time of the fluid is typically 1 to 2 minutes, and so is fast. The application of a steady state or continuous production of the binder via the apparatus 70 facilitates large scale application in the mining field, as it would obviate the need to provide storage of the binder, especially as providing adequate binder storage may be too large to be practicable.

It should be noted that all of the binder acts as an agglomerating fluid whereby the agglomerating fluid binds the hydrophobic particles (such as fine particles) together. Moreover, the binder or binder portions, when so divided, substantially retain their integrity throughout the agglomeration process—they are in effect immiscible in the agglomeration process. That is, the bulk of the binder or binder portions does not substantially break down during agglomeration and do not disperse into the feed stream. Rather, the binder or binder portions substantially keep their volume during the agglomeration process, and ideally during the initial dewatering process over a screen, attaching to the hydrophobic particles and only significantly break up during subsequent dewatering when stronger forces are applied, such as pressure or centrifugal forces, where the non-hydrophobic component is removed from the binder or binder portions.

Figure 9:
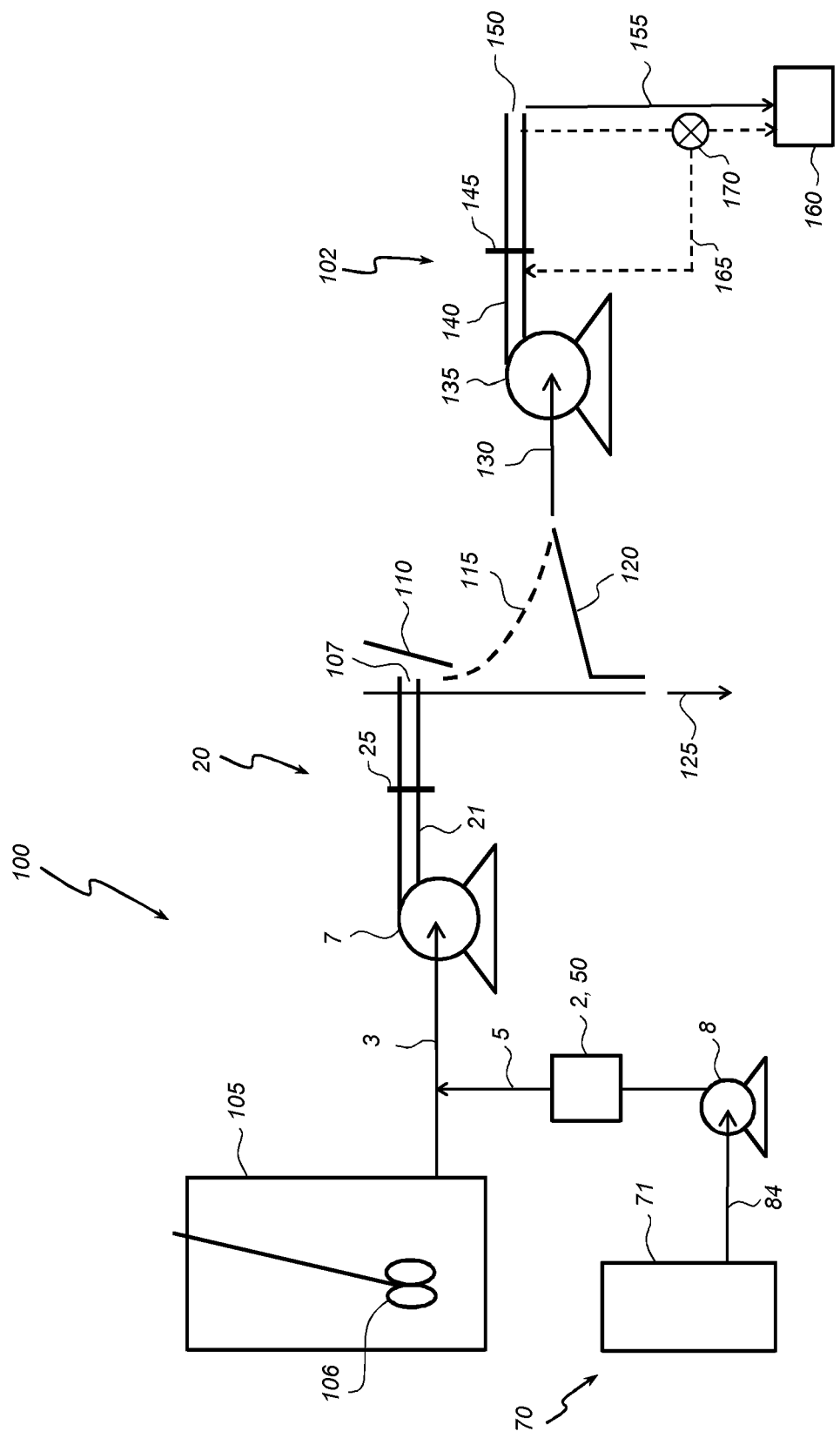
FIG. 9 is a schematic drawing illustrating a system for agglomerating hydrophobic particles according to a further embodiment of the invention.

Referring to FIG. 9, a system 100 comprising an agglomerating device 20 and a shearing device 102 according to another embodiment of the invention is illustrated, where corresponding features have been given the same reference numerals. The system 100 uses a feed source 105 having a mechanical agitator in the form of a radial impeller 106 and a water in oil emulsion as the binder, which is produced using the apparatus 70 of FIG. 8. As described in relation to the previous embodiments, the binder is divided using either the dividing device 2 or extruder 50 and then added via the binder conduit 5 to the feed being conveyed by the feed stream conduit 3 to an agglomerating device 20. The system 100 employs the agglomerating device 20 of FIG. 3, which comprises a passage 21 and an orifice plate 25, for applying shear to the mixture of water in oil emulsion binder and feed slurry to agglomerate the hydrophobic particles in the same manner as described above.

An outlet 107 of the agglomerating device 20 directs the agglomerated product to a shield 110 for dissipating the kinetic energy of the emerging agglomerated product. In this embodiment, the shield takes the form of an inclined plate 110, but in other embodiments the shield can take the form of a more curved structure that prevents "splashing" of the agglomerated product when it impacts the shield. From the inclined plate 110, the agglomerated product then falls on a screen 115 to remove excess liquid (water) and tailings, which then fall on an inclined surface 120 and exit through an outlet 125. The agglomerated product is then sent through a conduit 130 to the shearing device 102.

In the shearing device 102, a pump 135 pumps the agglomerated product through a passage in the form of a pipe 140 that has an orifice plate 145 to apply very high shear to the agglomerated product. This application of very high shear collapses the water in oil binder to release the trapped water, enabling this additional moisture in the agglomerated product to be removed. The agglomerated product leaves the pipe 140 through an outlet 150 and is directed by a conduit 155 to a filter 160 that removes the water liberated from the binder, thus reducing the moisture content of the agglomerated product. It will be appreciated that other dewatering devices aside from a filter 160 can be used for this final stage, such as a centrifuge and the like. Alternatively or additionally, an outlet is provided for removing the collapsed water in oil binder from the system.

In a variation of this embodiment, the agglomerated product is recycled back to the pipe 140 via a recycle conduit 165 (shown in dashed lines in FIG. 9) to re-apply the shear forces to ensure that binder is fully collapsed. This recycling can be performed any number of time as required, such as due to the particle size, volume of the product, etc. A valve 170 is used to control whether to recycle the product back through the pipe 140 and orifice plate 145 or direct it towards the filter 160.

It will be appreciated by those skilled in the art that the shearing device 102 can take forms other than the pipe 140 and orifice plate 145, such as any of the agglomerating devices previously described in FIGS. 1 to 5B.

In other embodiments, a different type of mechanical agitator is used instead of agitator 6 or the radial impeller 106, such as for example, turbines, propellers, anchor-type agitators, paddle-type agitators and helical-type agitators.

As described above, the shearing process can be used to remove the non-hydrophobic substance part of the binder from the agglomerated product. In the case of the binder being a water in oil emulsion, the action of the very high shear applied to the agglomerated product causes a change in the binder from a water in oil state to an oil in water state. This means that the emulsion is essentially broken; i.e. inverted. Hence, the oil remains with the hydrophobic particles, while the water drops join the rest of the water. Thus, dewatering of the agglomerated product after the application of shear becomes very efficient. The oil coating the hydrophobic particles almost certainly achieves a degree of agglomeration, making the hydrophobic particles coarser and the product much more permeable while the hydrophobicity is effective in separating the solids from the water.

It should also be appreciated that this process also minimises the moisture in the agglomerated product and the loss of water from the plant. In particular, as the particle size decreases, the specific surface area increases, tending to result in higher product moisture. In addition, the permeability of the feed material decreases markedly with decreasing particle size. The net result is a product having a moisture content considerably higher than preferred. For example, in coal beneficiation the excessive moisture may render the product unsuitable for sale, resulting in the discarding of the product with the tailings.

Accordingly, by applying shear to the agglomerated product, the moisture content of the fine particle product is reduced at minimal cost. The shear applied as part of the dewatering process can be from less than 5 s to less than 30 s, and preferably less than 15 s. Ideally, a very high shear is applied to product at a high solids concentration (ca. 30% solids) to produce very low moisture levels in the product that emerges after filtration or dewatering.

The initial application of shear to agglomerate the hydrophobic particles typically achieves beneficiation, but it could also be applied to material already beneficiated. In the case of an already beneficiated material, less binder is used and thus makes the process more economic. After agglomeration (which can be reduced from minutes to perhaps as little as a second or less), if the goal is to beneficiate the material then it will be necessary to discard excess water and/or unwanted particles (gangue). The concentrated product is then subjected to intense shear to invert the emulsion allowing the oil to remain with the hydrophobic particles, while the water is released and removed through a dewatering process like filtration.

It will be appreciated by those skilled in the art that some particles which are hydrophilic can be made hydrophobic by adsorbing specific reagents, known as collectors, at the surface of the particles. These particles can also be conditioned in the same manner by adding the binder and subjecting the mixture to a high shear rate to achieve agglomeration, and subsequently apply shear to the agglomerated product to collapse the binder and dewater the agglomerated product to obtain a reduced moisture content in the final product.

It is appreciated that the cost of adding the binder is significant, but this cost can be reduced if the product has been beneficiated (agglomerated) in other ways. The significant reduction in the moisture content obtained by using this additional shearing process can be the difference between producing a vendible product and discarding the product altogether. In such cases, the cost of adding the binder is effectively offset by the lower moisture content, and hence the ability to sell the product. In other cases, the fast agglomeration (beneficiation) ensures the overall process is economic due to the low capital cost of implementing the invention. Thus, the additional benefit of moisture reduction makes implementing the embodiments of the invention even more economically favourable.

It is therefore evident from this discussion that a further aspect of the invention relates to dewatering an existing agglomerated product by applying shear in the manner described above to collapse the binder and release the non-hydrophobic component.

Figure 10A:
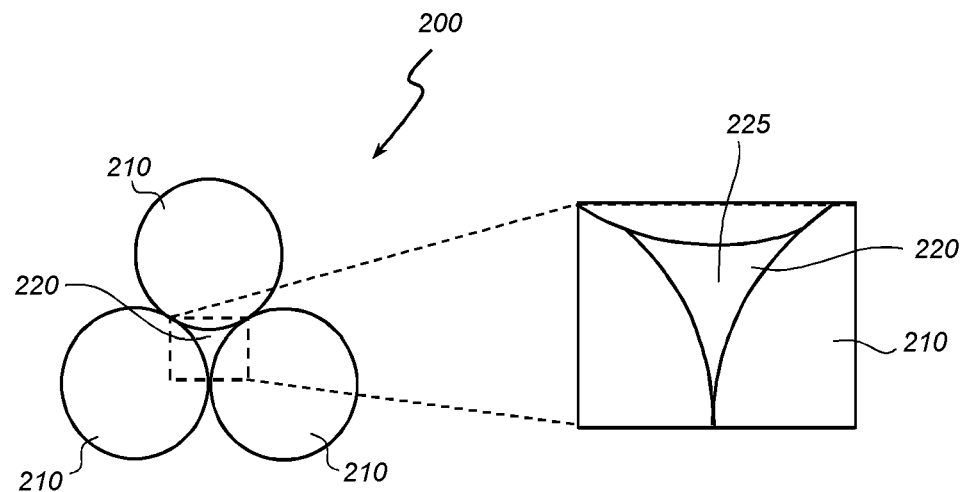
FIGS. 10A and 10B are schematic drawings comparing a conventional oil binder and a water in oil emulsion binder preferably used in embodiments of the invention.
Figure 10B:
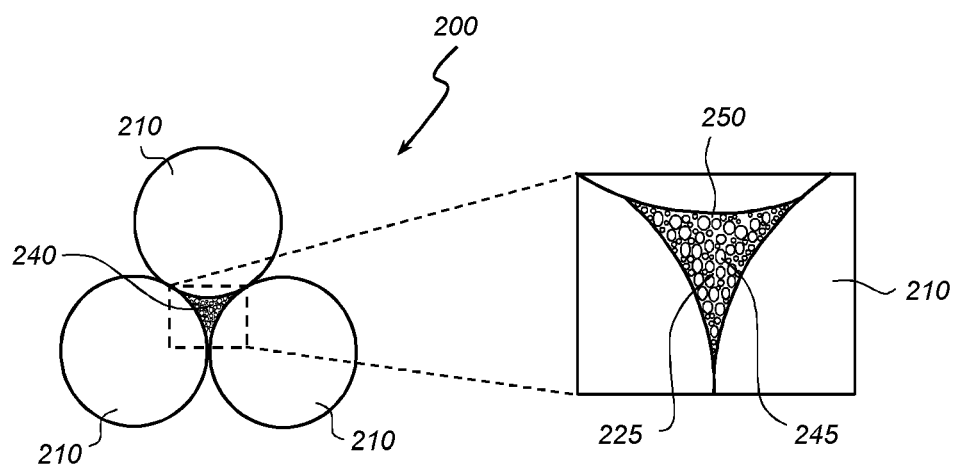

FIGS. 10A and 10B are schematic drawings comparing a conventional oil based binder with the water in oil emulsion binder preferred to use with embodiments of the invention. In FIG. 10A, the agglomerated hydrophobic particles 200 comprise solid hydrophobic particles 210 bonded by the oil binder 220 that fills the interstices 225 between the solid hydrophobic particles. In FIG. 10B, the agglomerated hydrophobic particles 200 also comprise solid hydrophobic particles 210 bonded by the water in oil binder 240 that fills the interstices 225 between the solid hydrophobic particles. However, within the binder 240, dispersed water droplets 245 are held by the oil with a continuous oil layer 250 being formed at the surfaces of the solid hydrophobic particles 210. Thus, space-filling functionality of the binder is achieved by small water drops 245 within the binder 240, thus reducing the reagent consumption. The use of the water in oil binder delivers efficient conditioning of the oil over the surface of the hydrophobic solid hydrophobic particles 210. By subjecting the agglomerated hydrophobic particles 200 to high shear the water drops 245 are released from the oil in the binder 240 and so can be removed by dewatering, thus delivering a low moisture content.

In a continuous version of the agglomeration process depicted in FIG. 6 as system 45, the water in oil emulsion binder was pre-dispersed in the mixing tank 2 and introduced via the conduit or line 5 to the main conduit or line 3, which contained an 8 wt % solid particle slurry fed from mixing tank 47. The particle-binder aqueous mixture was then pumped at 36 L/min through a 1 inch line to the ball valve 41 closed sufficiently to produce a pressure drop. After passing through the ball valve 41, the agglomerated slurry was discharged into a bucket to dissipate the energy of the stream. The slurry was then immediately screened using the screen 46 in the form of a sieve with an aperture size of 250 μm. In this embodiment the agglomerated product undergoes an initial dewatering step via the screen 46 forming a product that contains water within the binder that forms the agglomerates and some external water. This material can then be subjected to yet a further embodiment (such as FIG. 9) where the binder is subjected to significant forces through shear or other dewatering devices.

It should be noted that the solid feed consisted of a mixture of combustible, hydrocarbon based particles, particles which are non-combustible, and particles which are composites of both types of material. In the case of fine coal, it is desirable to recover the combustible material while rejecting the non-combustible material. The terms "combustible recovery" and "ash content" are used to define the quality of a coal product. The term "combustible recovery" is defined as the weight (wt) % of combustible material in the feed which reports to the product. The term "ash content" is defined as the weight (wt) % of the product which consists of non-combustible, or ash-forming, material. The term "organic liquid dosage" refers to the amount of the oil, introduced initially in the form of the water-in-oil emulsion, that is added to the feed. Hence, an organic liquid dosage of 1% wt means that for every 100 kg of feed solids there is 1 kg of the oil.

Figure 11:
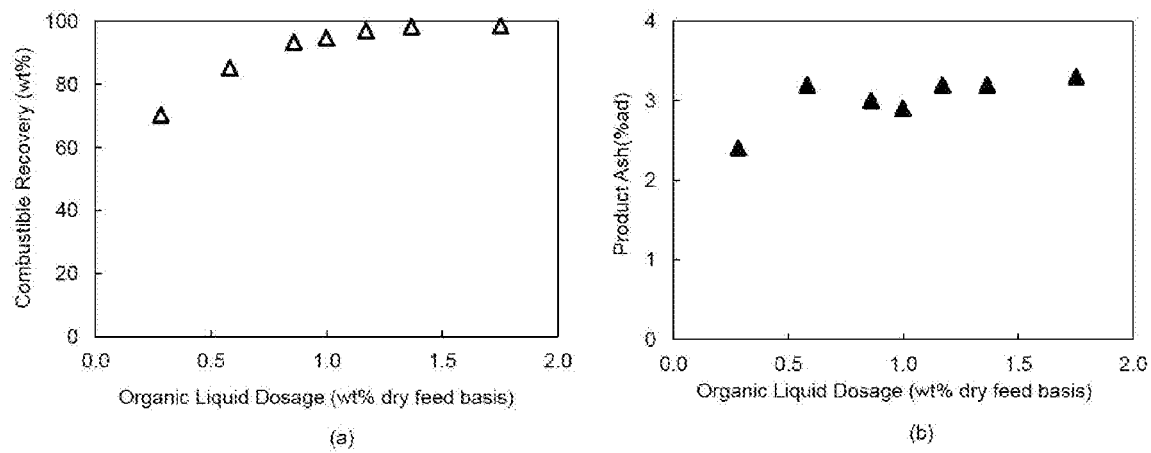
FIG. 11 illustrates (a) the recovery of the valuable (combustible) portion of the feed and (b) the product quality expressed in terms of ash (non-combustible) content as a function of the organic liquid dosage for the continuous agglomeration system according to one embodiment of the invention.

FIG. 11 shows (a) the recovery of the valuable (combustible) portion of the feed and (b) the product quality expressed in terms of ash (non-combustible) content as a function of the organic liquid dosage for the continuous agglomeration system according to this embodiment of the invention. The organic liquid dosage was varied by changing the rate of pump 8 on line 5. It should be noted that the original ash content of the feed was low, at 7.3%. As shown in FIG. 11(a), the combustible recovery increases with increases in organic liquid (binder) dosage until a dosage of 1 wt %, after which there is sufficient binder to form effectively all of the valuable material into recoverable agglomerates. FIG. 11(b) indicates that the product ash was typically 3%, less than half of the feed ash. Therefore the data in FIG. 11 confirms that the water in oil emulsion binder used in the embodiments of the invention is highly selective while simultaneously achieving high combustible recoveries. In other cases, different feed sources containing higher levels of the feed ash content, exceeding 50%, have been subjected to beneficiation using the binder, producing product ash content values below 10%.

Figure 12:
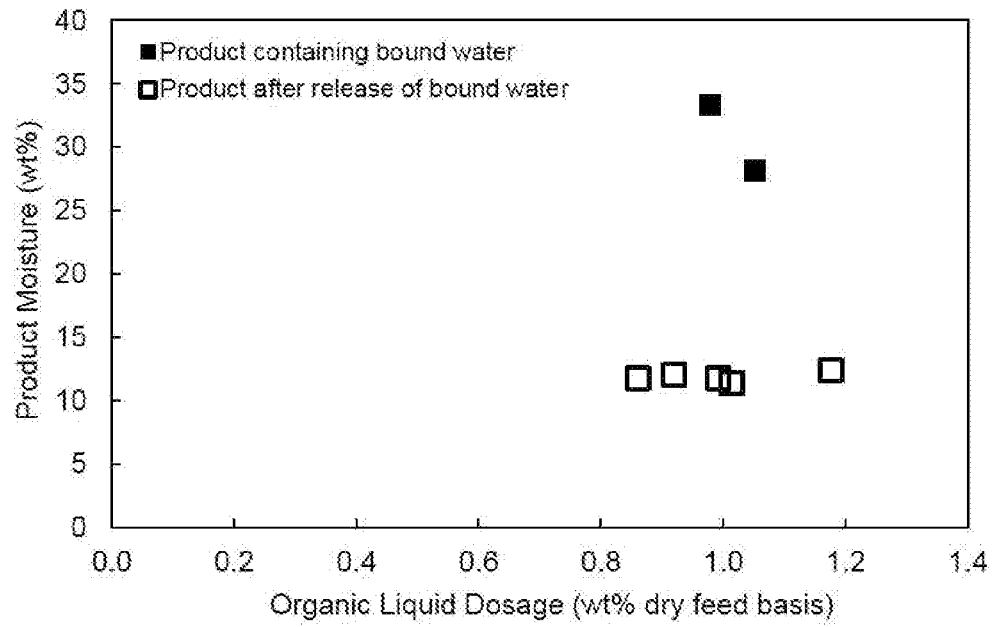
FIG. 12 is a graph showing the moisture content of the final product produced by the embodiments of the invention.

In a separate investigation, material consisting of fine coal and gangue particles was agglomerated using the binder in a high speed blender at 22,000 rpm for 7 s. The agglomerated material was then recovered using a screen with an aperture size of 250 μm. The moist material residing on the screen, largely the product and binder, was then poured into a stainless steel filtration vessel. The vessel was pressurised to 7 Bar and was permitted to operate for 90 s. In some cases, the moist material residing on the screen was subject to high shear using the blender (15 s at 22,000 rpm) prior to filtration to destroy the binder structure and release the internal water. FIG. 12 shows the moisture values obtained. The filled square symbols show the product moisture for the material containing the bound water, in the form of the binder. In this case the moist product collected on the screen was subjected to filtration only. The hollow square symbols indicate the product moisture obtained when the moist product collected on the screen was subjected to high shear to firstly break the binder and release the bound water, and was then subjected to filtration.

FIG. 12 shows that the direct filtration of the product containing bound water produced poor moisture content values in the range of 25-35%. This result was not surprising as the pressures generated in the filtration vessel were not sufficient to destroy the structure of the binder and thus the water remained within the emulsion-particle agglomerate structure. However, FIG. 12 also shows that by destroying the binder using high shear prior to the filtration a very low product moisture of approximately 11 to 12 wt % can be achieved. This low level is less than half the typical level obtained for fine hydrophobic particles following conventional beneficiation technologies. It was also noted that the filtrate was clear and filtration rates were much faster than if the binder was not applied to the fine coal, perhaps due to some residual agglomeration. Hence, there is a clear advantage in applying shear to the agglomerated product to reduce its moisture content. Therefore, the water in oil emulsion binder used in the embodiments of the invention, coupled with strong forces to break the binder, has significant advantages in lowering moisture.

The particle size distribution of the coal used in the feed which was agglomerated and subject to the moisture content analysis had a sauter mean diameter of 39.2 μm, and 50% of the particle volume was smaller than 164 μm.

The embodiments of the invention may be used in the application of agglomerating any hydrophobic particles, but they are preferably used in agglomerating fine coal particles. In addition, the embodiments of the invention are preferably used to agglomerate hydrophobic particles of up to 0.5 mm in diameter and most preferably 0.2 mm in diameter. However, it will be appreciated that the "fine" particles may be classified with a different diameter size depending on the type of material that is being recovered. Hence, the invention is also applicable to the recovery of other types of hydrophobic particles having a diameter of up to 2 mm.

It will further be appreciated that any of the features in the preferred embodiments of the invention can be combined together and are not necessarily applied in isolation from each other. For example, the multiple agglomerating devices 4 in FIG. 2 can be replaced with any of the agglomerating devices 20, 30, 40 of FIGS. 3 to 5B, or any combination of the agglomerating devices 4, 20, 30, 40. Similar combinations of two or more features from the above described embodiments or embodiments of the invention can be readily made by one skilled in the art.

It is also contemplated that the apparatus 1 can be used in conjunction with conventional flotation and classification processes. For ease of reference, the inventor will hereinafter refer to the method of the invention as "3D Flotation". This is to contrast the invention to normal flotation which is "2D" as the hydrophobic particles attach to the outer surface of the bubbles. Hence, normal flotation requires drainage time for fluid to pass downwards relative to the bubbles. In the case of 3D flotation, the hydrophobic particles attach to the binder, deforming the material in a way that allows more hydrophobic particles to keep attaching, gradually building the product up, with no need for a slow drainage process apart from the drainage between the final agglomerates. This 3D Flotation process occurs very efficiently in a high shear environment provided by the invention that permits very short residence times.

The invention may also be used to exploit different beneficiation technologies to achieve results that go well beyond what is currently possible using each technology on its own. Hence, the invention may be used in a system that comprises (i) conventional flotation, or more advanced forms of flotation, followed by (ii) 3D flotation. In this case, the conventional or 2D flotation process involves hydrophobic particles attaching to the 2D surface of rising air bubbles, while in the 3D flotation process the hydrophobic particles attach to a hydrophobic binder. In some embodiments, the first stage conventional flotation process involves so-called reverse flotation, though the invention applies equally to the normal mode of 2D flotation. In reverse flotation, the gangue particles are made hydrophobic and are therefore floated, leaving a dilute high grade product behind containing some gangue particles that failed to float. In the normal mode of 2D flotation, the product is made hydrophobic and is therefore floated.

The 2D flotation process may also be enhanced by using a reflux flotation cell, which uses an inverted fluidisation bed located above inclined plates and which typically delivers processing rates ten times higher than what has been previously possible using a conventional flotation cell. Thus, the reflux flotation cell, with its arrangement of inclined channels, is used to increase the flotation processing rate.

Example

In this example, reverse flotation is used to recover and concentrate the gangue, leaving behind a dilute stream of the hydrophilic product. It is known that flotation performs poorly for hydrophobic particles below 0.020 mm in diameter, given that it is difficult to float the ultrafines. Moreover, flotation processes are poor at floating the relatively coarse hydrophobic particles, larger than 0.2 mm. Thus, reverse flotation typically suffers a drop in product grade due to the non-floated ultrafine and coarse gangue. However, using the invention, the 3D flotation process is now applied to the dilute stream to efficiently remove these ultrafine hydrophobic particles and coarser hydrophobic particles.

Given the flotation has already removed the bulk of the hydrophobic gangue as a concentrate, relatively little hydrophobic gangue remains within the dilute stream. Thus, the level of binder, needed to extract the remaining hydrophobic particles is greatly reduced. Moreover, the hydrophobic coarse particles have a low specific surface area, and hence requires far less of the binder for a given mass. Where the binder is a water in oil emulsion, this means that the amount of oil required is now insignificant, rendering the 3D flotation process more economic in this application. As a consequence, by marrying an initial flotation process to the 3D flotation process, the level of binder required to remove the remaining hydrophobic particles is greatly reduced.

Since the 3D flotation process is very fast and efficient, the capital investment associated with this final stage is small. Hence, its addition to the standard 2D flotation process would not significantly increase capital costs, even though the 3D flotation process is applied to the dilute stream of the 2D flotation process.

In the context of reverse flotation of iron ore, 3D flotation, once applied, delivers a dilute but high grade dense mineral product, which can be concentrated to a high solids level by a range of standard methods including flocculation and thickening, followed by filtration. Thus, the invention offers major advantages over current options in recovering and concentrating dense minerals to very high grade.

However, equally, when the standard mode of flotation is used (i.e. 2D flotation) to produce a concentrated product, the subsequent application of 3D flotation delivers additional high value material including coarser composite hydrophobic particles, along with the ultrafine hydrophobic particles.

In conclusion, strong synergy is achieved with this application of the invention in a combined system with an existing 2D flotation process, given that 2D flotation (reverse or otherwise) and 3D flotation applied on their own is ineffective in many cases. However, by applying both 2D and 3D flotation, it is possible to achieve the required high grade product using reverse flotation and the required high recovery using the standard mode of flotation, with greatly reduced operating costs.

While the invention has been described in relation to specific applications in coal beneficiation and iron ore beneficiation, it will be appreciated that the invention can be applied to any system currently subjected to flotation. The agglomeration is selective, in favour of any hydrophobic particles present in the feed. It is well known in flotation that reagents can be used to promote hydrophobicity, and hence the particles themselves can be made selectively hydrophobic through reagent addition. Thus, the invention can be readily applied to the recovery of base metal ores such as copper. Moreover, the extent of the liberation does not have to be high, given that 3D Flotation permits the entire particle to become embedded within the binder portion due to the presence of some hydrophobic portion of the particle. Given the very short residence time, there is significant scope for capturing poorly liberated particles. Hence the particles do not have to be ground to the sizes normally required for conventional flotation. Thus there is significant scope for capturing the copper ore particles at coarser sizes, thus reducing the level of comminution and associated energy consumption. This means that 3D flotation can lead to very large reductions in grinding operating costs.

In yet another application of the invention, the water in oil emulsion binder can be used to capture exceedingly fine drops of oil from water. This application is relevant to the oil and gas industry and to providing solutions to waste water treatment. The agglomeration can be thought of as a binder that acts like a "mop" efficiently removing the tiny oil drops.

It is also contemplated that the invention may also be used in many other applications, including the removal of algae from water, removing protein wastes from water, treating water released through fracking, and otherwise recovering fine hydrophobic particles.

By adding a binder comprising 50% or more by volume of a non-hydrophobic substance into the slurry and applying a high shear to the slurry and binder, the invention achieves rapid agglomeration of hydrophobic particles. As a consequence, the embodiments of the invention are able to achieve significantly shorter residence times (as little as 0.2 s), resulting in an increase in efficiency, and can be readily scaled up. In addition, there are minimal or no moving parts, reducing maintenance for the apparatus. All these advantages of the invention result in significant technical and cost advantages over conventional methods and apparatuses. Furthermore, since the method and apparatus can be readily scaled up or added on to standard flotation processes, the invention can be readily implemented to existing systems and plants. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. A method for agglomerating hydrophobic particles from a feed slurry, comprising:
    adding a binder emulsion to a feed stream comprising said feed slurry, said binder emulsion comprising 50% or more by volume of a non-hydrophobic substance contained within a hydrophobic binder;
    conveying said feed stream and said binder to an agglomerating device; and
    applying a high shear to said feed stream and said binder emulsion in said agglomerating device so as to cause said hydrophobic particles to collide and bind to said binder emulsion, thereby agglomerating said hydrophobic particles with said binder emulsion;
    removing said agglomerated hydrophobic particles from said feed stream;
    initially dewatering said agglomerated hydrophobic particles to remove non-agglomerated material; and
    subsequently dewatering said agglomerated hydrophobic particles to remove said non-hydrophobic substance from within said hydrophobic binder,
    wherein said agglomerating device comprises:
    a separation chamber comprising an inlet, an outlet pipe centrally located in the separation chamber and a conical end, said conical end having a discharge outlet for removing coarser-sized non-agglomerated particles, wherein said shear applying step comprises inducing a high shear rotational flow within said separation chamber and wherein said feed stream and said binder emulsion enter tangentially into said separation chamber, relative to a cross-section of said separation chamber, and said agglomerated hydrophobic particles are removed from said feed stream as an overflow through the outlet pipe after moving radially inwards within said separation chamber; or
    a passage having an inlet, an outlet and a flow restricting device located within the passage between the inlet and the outlet, wherein said flow restricting device comprises an opening having a smaller diameter than the diameter of said passage, and said shear applying step comprises forcing said feed stream and said binder emulsion through said opening to cause a pressure drop in the flow of said feed stream and said binder emulsion.

2. The method of claim 1, further comprising dividing said binder emulsion into individual binder emulsion portions.

3. The method of claim 2, wherein said dividing step comprises stirring said emulsion binder in a solution to suspend said binder emulsion portions in said solution or extruding said binder emulsion directly into said feed stream, thereby forming said binder emulsion portions.

4. The method of claim 1, wherein said agglomerating device comprises said passage and said flow restricting device.

5. The method of claim 1, wherein said adding step comprises adding said binder emulsion to a first region of said feed stream that has a lower pressure than a second region of said feed stream.

6. The method of claim 5, wherein a feed pump is used to add said binder emulsion, wherein said first region is located before said feed pump and said second region is located after said feed pump.

7. The method of claim 1, wherein said subsequent dewatering step comprises applying at least one of pressure or centrifugal force to collapse said binder emulsion, releasing said non-hydrophobic substance from within said binder.

8. The method of claim 1, wherein said subsequent dewatering step comprises applying shear to said agglomerated hydrophobic particles to collapse said binder emulsion, releasing said non-hydrophobic substance from within said binder.

9. The method of claim 8, further comprising forcing said agglomerated hydrophobic particles through a reduced flow area to apply shear to said agglomerated hydrophobic particles.

10. The method of claim 9, further comprising passing said agglomerated hydrophobic particles through a shearing device comprising a passage and an opening having a smaller diameter than the diameter of said passage to form said reduced flow area, and forcing said agglomerated hydrophobic particles through said opening.

11. The method of claim 1, wherein said subsequent dewatering step comprises applying shear to said agglomerated hydrophobic particles for less than 30 seconds.

12. The method of claim 1, wherein said binder emulsion comprises a concentrated water in oil emulsion, said non-hydrophobic substance comprising water and said hydrophobic binder comprising oil.

13. The method of claim 1, wherein said binder emulsion comprises 60% or more by volume of the non-hydrophobic substance.

14. The method of claim 1, wherein said hydrophobic particles have a diameter of up to 2 mm.

15. The method of claim 1, wherein said feed stream comprises the dilute overflow stream from a flotation process or a reverse flotation process.

16. The method of claim 1, wherein said subsequent dewatering step comprises applying shear to said agglomerated hydrophobic particles for less than 1 second.

17. The method of claim 1, wherein said binder emulsion comprises 90% or more by volume of the non-hydrophobic substance.

18. The method of claim 1, wherein said hydrophobic particles have a diameter of up to 0.2 mm.

19. The method of claim 4, wherein the flow restricting device comprises at least one of (a) an orifice plate transversely mounted in said passage; (b) a wall portion that tapers towards said opening to form a Venturi-type passage; or (c) a valve having an internal bore defining said opening, wherein, in a fully open position, said feed stream and said binder emulsion flows through said opening and said internal bore and, in a fully closed position, said feed stream and said binder emulsion is prevented from flowing through said opening and said internal bore.

20. An apparatus for agglomerating hydrophobic particles from a feed slurry, comprising:
a feed stream conduit fluidly connected to an agglomerating device for conveying said feed slurry to said agglomerating device; and
a binder conduit fluidly connected to said feed stream conduit for adding a binder emulsion to said feed slurry, said binder emulsion comprising 50% or more by volume of a non-hydrophobic substance contained within a hydrophobic binder;
wherein a high shear is induced within said agglomerating device to cause said hydrophobic particles to collide and bind to said binder emulsion, thereby agglomerating said hydrophobic particles together; and
wherein said agglomerated hydrophobic particles and said binder emulsion are removed after passing through said agglomerating device;
further comprising a first dewatering device for initially dewatering said agglomerated hydrophobic particles to remove non-agglomerated material; and
a second dewatering device for subsequently dewatering said agglomerated hydrophobic particles to remove said non-hydrophobic substance from within said hydrophobic binder,
wherein said agglomerating device comprises:
a separation chamber comprising an inlet, an outlet pipe centrally located in the separation chamber, and a conical end, said conical end having a discharge outlet for removing coarser-sized non-agglomerated particles, wherein a high shear rotational flow is induced within said separation chamber, said rotational flow causing segregation of said agglomerated hydrophobic particles and non-agglomerated particles, and wherein said agglomerated hydrophobic particles and said binder emulsion are removed as an overflow through said outlet pipe after moving radially inwards within said separation chamber, or
a passage having an inlet, an outlet and a flow restriction device located within the passage between the inlet and the outlet, wherein said flow restricting device comprises an opening having a smaller diameter than the diameter of said passage, and said agglomerating device forces a flow of said feed stream and said binder emulsion through said opening to induce a pressure drop in said flow, thereby causing said colliding and binding of said hydrophobic particles to said binder emulsion.

21. The apparatus of claim 20, further comprising a dividing device for separating said binder emulsion into individual binder emulsion portions, wherein said binder conduit fluidly connects said dividing device to said feed stream conduit.

22. The apparatus of claim 21, wherein said dividing device comprises a mixing device for stirring said binder emulsion in a solution to form suspended binder emulsion portions in said solution or an extruder for extruding said binder emulsion into said feed stream conduit.

23. The apparatus of claim 20, wherein said agglomerating device comprises said separation chamber.

24. The apparatus of claim 20, wherein said agglomerating device comprises said passage and said flow restricting device.

25. The apparatus of claim 24, wherein said flow restricting device comprises an orifice plate transversely mounted in said passage.

26. The apparatus of claim 24, wherein said flow restricting device comprises a wall portion that tapers towards said opening to form a Venturi-type passage.

27. The apparatus of claim 20, wherein said feed stream comprises the dilute underflow stream from a flotation process or a reverse flotation process.

28. A system for agglomerating hydrophobic particles from a feed slurry, comprising the apparatus of claim 20 and a shearing device for applying shear to said agglomerated hydrophobic particles, wherein said shearing device comprises a passage and an opening having a smaller diameter than the diameter of said passage to form a reduced flow area through which said agglomerated hydrophobic particles flow, in order to apply said shear.

29. The apparatus of claim 24, wherein the flow restricting device comprises a valve having an internal bore defining said opening, wherein, in a fully open position, said feed stream and said binder emulsion flows through said opening and said internal bore and, in a fully closed position, said feed stream and said binder emulsion is prevented from flowing through said opening and said internal bore.

30. The apparatus of claim 29, wherein the flow restricting device comprise a rotatable ball valve.

\* \* \* \* \*